United States Patent
Omura

(10) Patent No.: US 7,421,536 B2
(45) Date of Patent: Sep. 2, 2008

(54) ACCESS CONTROL METHOD, DISK CONTROL UNIT AND STORAGE APPARATUS

(75) Inventor: Hideaki Omura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 199 days.

(21) Appl. No.: 10/999,127

(22) Filed: Nov. 30, 2004

(65) Prior Publication Data

US 2006/0047901 A1    Mar. 2, 2006

(30) Foreign Application Priority Data

Aug. 24, 2004   (JP)   ............................. 2004-244052

(51) Int. Cl.
*G06F 12/00*   (2006.01)

(52) U.S. Cl. .................. 711/113; 711/100; 711/154; 711/163

(58) Field of Classification Search .............. 711/100, 711/113, 118, 154, 163
See application file for complete search history.

(56) References Cited

U.S. PATENT DOCUMENTS

| | | | |
|---|---|---|---|
| 6,490,635 B1 * | 12/2002 | Holmes | 710/3 |
| 6,601,137 B1 * | 7/2003 | Castro et al. | 711/113 |
| 6,880,043 B1 * | 4/2005 | Castro et al. | 711/113 |
| 7,032,068 B2 * | 4/2006 | Kuwata | 711/113 |
| 7,043,610 B2 * | 5/2006 | Horn et al. | 711/144 |

FOREIGN PATENT DOCUMENTS

| | | |
|---|---|---|
| JP | 07-319771 | 12/1995 |
| JP | 2000-227865 | 8/2000 |

* cited by examiner

*Primary Examiner*—Jasmine Song
(74) *Attorney, Agent, or Firm*—Staas & Halsey LLP

(57) ABSTRACT

An access control method receives an access command, and permitting access to a cache segment accessed by the access command if no access range overlap occurs, even when a contention exists between a cache segment and an arbitrary cache segment that is already being accessed. The cache memory is segmented into the cache segments.

24 Claims, 10 Drawing Sheets

| LBA | ACCESS SIZE | | | | | |
|---|---|---|---|---|---|---|
| LUN | COMMAND (READ OR WRITE) | | | | | |
| | | | | | | |
| CACHE SEGMENT #00 | START LBA OFFSET | ACCESS SIZE | | | | |
| CACHE SEGMENT #01 | START LBA OFFSET | ACCESS SIZE | | | | |
| . . | . . | . . | | | | |
| CACHE SEGMENT #N | START LBA OFFSET | ACCESS SIZE | | | | |

FIG.5

| 225 | | | | | | | | | |
|---|---|---|---|---|---|---|---|---|---|
| LBA | LUN | CACHE MEMORY ADDRESS | DATA EXISTENCE INFO (BIT-MAP) | ACCESS RANGE INFORMATION (BIT-MAP) | READ STATUS | WRITE STATUS | STAGING STATUS | OTHER STATUS | |
| | | | | | READ NO. | WRITE NO. | STAGING NO. | USED NUMBER | |

ACCESS CONTROL METHOD, DISK CONTROL UNIT AND STORAGE APPARATUS

BACKGROUND OF THE INVENTION

This application claims the benefit of a Japanese Patent Application No.2004-244052 filed Aug. 24, 2004, in the Japanese Patent Office, the disclosure of which is hereby incorporated by reference.

1. Field of the Invention

The present invention generally relates to access control methods, disk control units and storage apparatuses, and more particularly to an access control method for a cache memory that is segmented into a plurality of cache segments, a disk control unit for controlling a disk unit by such an access control method, and a storage apparatus using such an access control method.

2. Description of the Related Art

A disk control unit which controls a disk unit having a plurality of magnetic disks improves the access performance (or access speed) by increasing the storage capacity of a cache memory that is provided within the disk control unit. In such a disk control unit, an access from a host unit is processed via the cache memory within the disk control unit. In other words, when an access command from the host unit is a read command that hits data in the cache memory, the data are transferred from the cache memory to the host unit without carrying out a read process, that is, without carrying out a staging process, from the disk unit. On the other hand, when the access command from the host unit is a write command, write data from the host unit are temporarily stored in the cache memory, and a write-back to the disk unit is made asynchronously, that is, a background write-back is made, after the write command ends. Hence, when the access command from the host unit hits the data in the cache memory, the data in the cache memory are immediately transferred to the host unit so as to improve the access performance.

The cache memory within the disk control unit is segmented into cache segments, and is managed in units of cache segments. For example, the cache segment is set to 16 kB, 64 kB or the like. In the disk control unit, allocation and purge are made in units of cache segments, so as to manage the data in the cache memory.

For example, in the disk control apparatus having the cache segment set to 64 kB, for example, if a 8 kB write command is issued from the host unit, 1 cache segment (64 kB) is allocated for the processing of the write command within the disk control unit, and the write data are received. During this write data reception, in order to avoid collision (or access contention) with other write commands, the cache segment is set to an "in-use" state to carry out an exclusive control which will hereinafter be referred to as a "cache segment exclusive control".

A Japanese Laid-Open Patent Application No.7-319771 proposes a disk control unit that optimizes a cache segment capacity with respect to an amount of data transfer. In addition, a Japanese Laid-Open Patent Application No.2000-227865 proposes a method of improving a utilization efficiency of the cache memory by setting cache regions to cache segments having an optimum segment size reflecting logical characteristics at the time of making a read or write process with respect to the disk.

The cache segment exclusive control carries out the exclusive control in units of cache segments even in a case where an access range is small, to thereby affect the access performance. For example, in the case of a sequential write access that successively writes 8 kB data, even if the next write command is received while the first 8 kB data is being written, the next write command must wait by the cache segment exclusive control because the cache segment is in use by the previous write command. In addition, the write command next to the next write command must also wait, and up to 7 such 8 kB write commands must wait in a worst case and be sequentially processed one by one.

The regions within the cache memory subject to the cache segment exclusive control become smaller if the cache segments are made smaller. For this reason, it is possible to improve the utilization efficiency of the cache memory, and reduce the waiting in the case of the sequential access. However, if the cache segments are small, the management of the regions within the cache memory becomes that much more complex, thereby making it difficult to improve the access performance.

On the other hand, the management of the regions within the cache memory becomes simpler if the cache segments are made larger, thereby improving the access performance to a certain extent. However, if the cache segments are large, the utilization efficiency of the cache memory deteriorates. In addition, the waiting in the case of the sequential access increases, to deteriorate the access performance of the sequential access. Therefore, the cache segments are conventionally set to a size that will not make the management of the regions within the cache memory extremely complex.

SUMMARY OF THE INVENTION

Accordingly, it is a general object of the present invention to provide a novel and useful access control method, disk control unit and storage apparatus, in which the problems described above are suppressed.

Another and more specific object of the present invention is to provide an access control method, a disk control unit and a storage apparatus, which permit data access if there is no contention of access ranges, even if a contention of cache segments exists, so as to process the accesses in parallel to improve the access performance.

Still another object of the present invention is to provide an access control method for a cache memory that is segmented into cache segments, comprising the steps of (a) receiving an access command; and (b) permitting access to a cache segment accessed by the access command if no access range overlap occurs, even when a contention exists between the cache segment and an arbitrary cache segment that is already being accessed. According to the access control method of the present invention, it is possible to permit data access if there is no contention of access ranges, even if a contention of cache segments exists, so as to process the accesses in parallel to improve the access performance.

A further object of the present invention is to provide a disk control unit for controlling an input to and an output from one or a plurality of disks, comprising a cache memory that is segmented into cache segments; and a control unit configured to permit access to a cache segment accessed by an access command if no access range overlap occurs, even when a contention exists between the cache segment and an arbitrary cache segment that is already being accessed. According to the disk control unit of the present invention, it is possible to permit data access if there is no contention of access ranges, even if a contention of cache segments exists, so as to process the accesses in parallel to improve the access performance.

Another object of the present invention is to provide a storage apparatus comprising a storage unit having a plurality of recording media; and a medium control unit configured to control input to and output from the recording media, the medium control unit comprising a cache memory that is segmented into cache segments; and a control unit configured to permit access to a cache segment accessed by an access command if no access range overlap occurs, even when a contention exists between the cache segment and an arbitrary cache segment that is already being accessed. According to the storage apparatus of the present invention, it is possible to permit data access if there is no contention of access ranges, even if a contention of cache segments exists, so as to process the accesses in parallel to improve the access performance.

Other objects and further features of the present invention will be apparent from the following detailed description when read in conjunction with the accompanying drawings.

BRIEF DESCRIPTION OF THE DRAWINGS

FIG. 4 is a diagram showing a structure of a job management table;

FIG. 5 is a diagram showing a structure of a cache segment management table;

DESCRIPTION OF THE PREFERRED EMBODIMENTS

Figure 1:
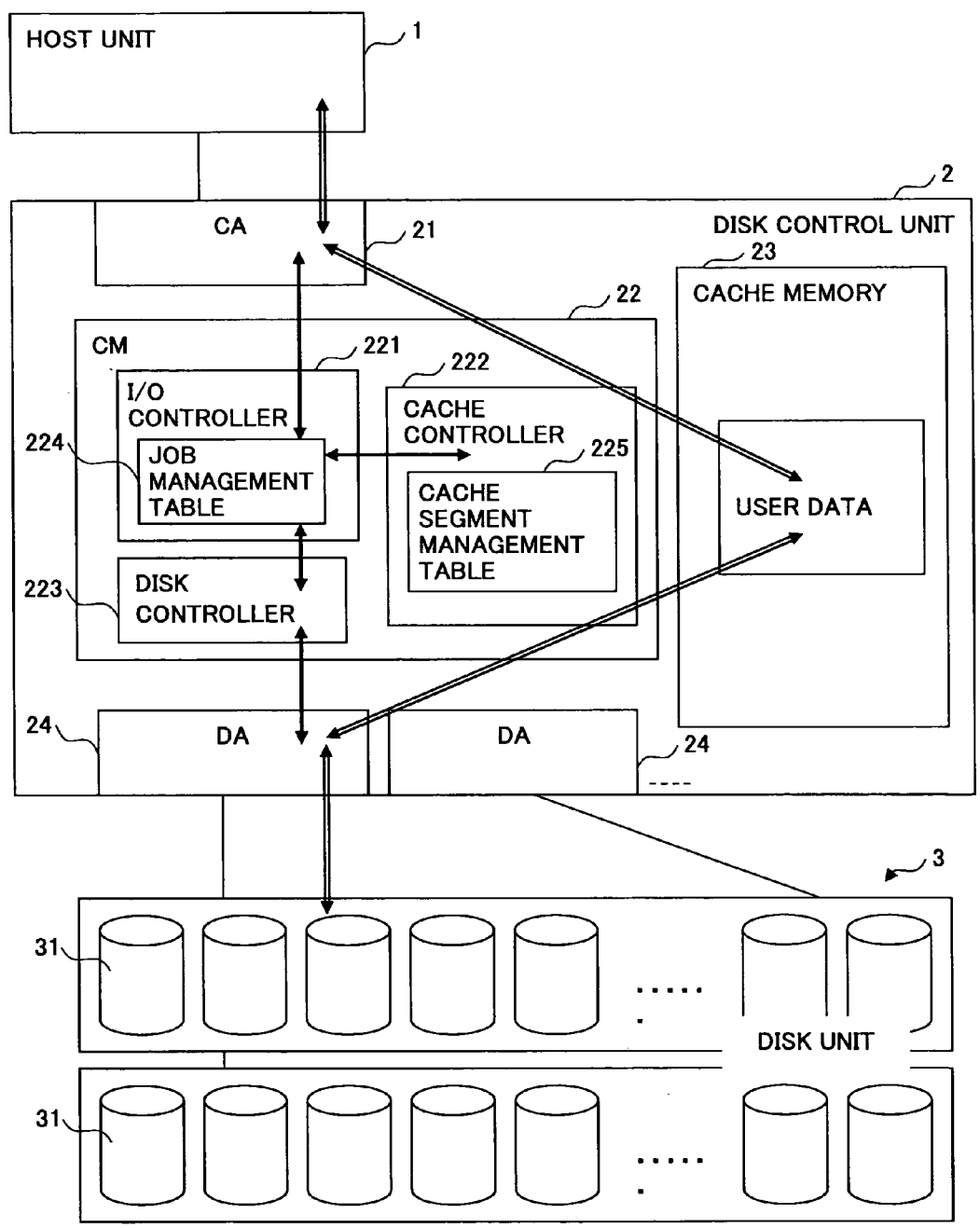
FIG. 1 is a system block diagram showing an important part of an embodiment of a storage apparatus according to the present invention.

A description will be given of embodiments of an access control method, a disk control unit and a storage apparatus according to the present invention, by referring to the drawings.

FIG. 1 is a system block diagram showing an important part of an embodiment of the storage apparatus according to the present invention. In this embodiment of the storage apparatus, the present invention is applied to a magnetic disk unit. This embodiment of the storage apparatus employs an embodiment of the access control method according to the present invention and an embodiment of the disk control unit according to the present invention.

As shown in FIG. 1, a storage apparatus includes a host unit 1, a disk control unit 2, and a disk unit 3. It is not essential for the host unit 1 to be provided within the storage apparatus, and the host unit 1 may be connected externally to the storage apparatus.

The host unit 1 may be formed by a server or a general-purpose computer having a known structure. The disk control unit 2 includes a channel adapter (CA) 21, a central module (CM) 22, a cache memory 23 and a device adapter (DA) 24. The CA 21 receives commands or request from the host unit 1, and also exchanges data between the host unit 1 and the disk control unit 2. The CM 22 controls an input or output (I/O) process of the disk control unit 2. The cache memory 23 has a structure that is segmented into predetermined units, that is, cache segments, of 16 kB, 64 kB or the like, as will be described later. The DA 24 exchanges data between a plurality of disks 31 within the disk unit 3 and the disk control unit 2.

The CM 22 includes an input or output (I/O) controller 221 having a job management table 224 which will be described later, a cache controller 222 having a cache segment management table 225 which will be described later, and a disk controller 223. The I/O controller 221 manages inputs from outputs to the host unit 1, and carries out a scheduling of processes with respect to the CA 21 at the front end, the disk controller 223 at the back end and the DA 24. The I/O controller 221 also monitors input or output (I/O) time and the like. The cache controller 222 manages the cache memory 23, and allocates the cache memory 23 with respect to an input or output (I/O) process such as a request from the I/O controller 221, so as to manage user data in the cache memory 23. The disk controller 223 manages the disk unit 3 which is under control of the disk control unit 2, and carries out a scheduling of back end processes such as a stating process and a write-back process with respect to the DA 24.

Figure 2:
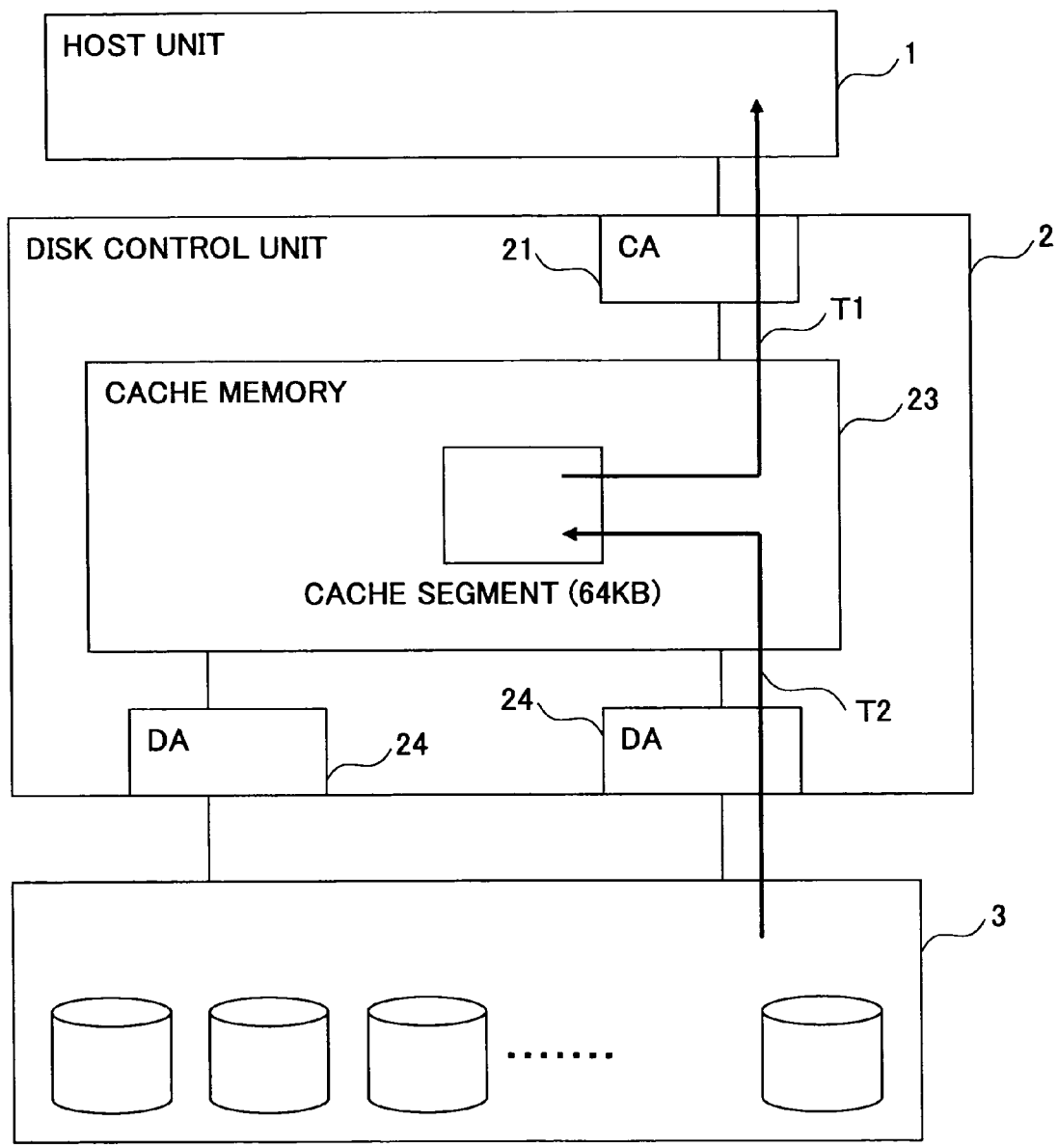
FIG. 2 is a system block diagram for explaining a read process.
Figure 3:
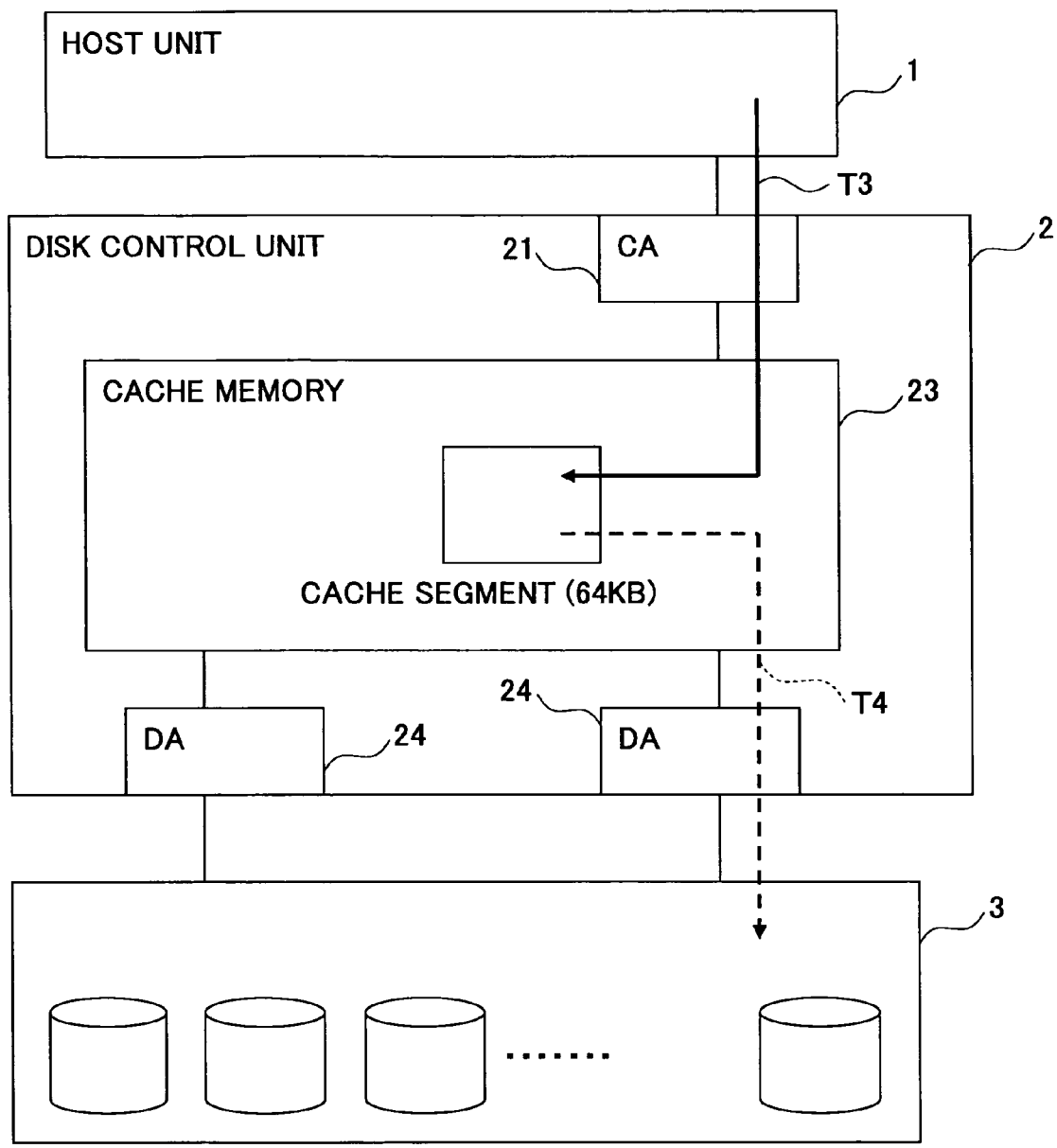
FIG. 3 is a system block diagram for explaining a write process.

FIG. 2 is a system block diagram for explaining a read process, and FIG. 3 is a system block diagram for explaining a write process. In FIGS. 2 and 3, those parts which are the same as those corresponding parts in FIG. 1 are designated by the same reference numerals, and a description thereof will be omitted. An access from the host unit 1 is process via the cache memory 23 within the disk control unit 2.

In FIG. 2, when the access command from the host unit 1 is a read command that hits data in the cache memory 23, the data are transferred from the cache memory 23 to the host unit 1 as indicated by an arrow T1 without carrying out a read process, that is, without carrying out a staging process, from the disk unit 3. On the other hand, when the access command from the host unit 1 is a read command that does not hit the data in the cache memory 23, a read process, that is, a staging process is carried out from the disk unit 3 as indicated by an arrow T2, before transferring the data from the cache memory 23 to the host unit 1 as indicated by the arrow T1.

In FIG. 3, when the access command from the host unit 1 is a write command, write data from the host unit 1 are temporarily stored in the cache memory 23 as indicated by an arrow T3, and a write-back to the disk unit 3 is made asynchronously, that is, a background write-back is made as indicated by an arrow T4, after the write command ends.

Hence, when the access command from the host unit 1 hits the data in the cache memory 23, the data in the cache memory 23 are immediately transferred to the host unit 1 so as to improve the access performance.

FIG. 4 is a diagram showing a structure of the job management table 224. The job management table 224 stores job management information. The job management information includes a logical block address (LBA) which indicates the location of the data and an access size, a logical unit address (LUN) and a command (read or write command), and a cache segment, a start LBA offset and an access size. This embodiment is characterized in that the cache segment, the start LBA offset and the offset size are included in the job management information. The cache segment indicates the cache segment that is used by an input or output (I/O) process such as a read or write process or, by a staging process. The start LBA offset and the access size indicate the access range within the cache segment.

FIG. 5 is a diagram showing a structure of the cache segment management table 225. The cache segment management table 225 stores cache segment management information. The cache segment management information includes an LBA, an LUN, a cache memory address, data existence information, access range information, read status and read number, write status and write number, staging status and staging number, and other status and used number. In this embodiment, the data existence information and the access range information are stored in a bit map. This embodiment is characterized in that the access range information, the read status and the read number, the write status and the write number, the staging status and the staging number, and the other status and the used number are included in the cache segment management information. The access range information is formed by bit map information to which an access range or an access portion is set by the I/O process such as the read or write process or, the staging process. The read status is set when the cache segment is used by the I/O process, namely, the read process, and the read number indicates the number of times the read process is being executed. The write status is set when the cache segment is used by the I/O process, namely, the write process, and the write number indicates the number of times the write process is being executed. The staging status is set when the cache segment is used by the staging process, and the staging number indicates the number of times the staging process is being executed. The other status is set when the cache segment is used by another process, such as a write-back process, and the used number indicates the number of times the other process is being executed. Each of the read status, the write status, the staging status and the other status is a kind of operation flag indicating the process that is using the cache segment.

As described above, the cache memory 23 within the disk control unit 2 is segmented into predetermined cache segments of 16 kB, 64 kB or the like, and each of the cache segments is managed based on the cache segment management information stored in the cache segment management table 225. For example, if a certain cache segment is in use (that is, being accessed), a status indicating that this certain cache segment is in use is stored in the cache segment management table 225, and in addition, the information indicating whether the read process or the write process is being carried out is also stored in the cache segment management table 225. In other words, if the I/O process is a read process, the read status is stored in the cache segment management table 225 and "1" is added to the read number, so as to store the in-use state of the certain cache segment caused by the read process. Similarly, if the I/O process is a write process, the write status is stored in the cache segment management table 225 and "1" is added to the write number, so as to store the in-use state of the certain cache segment caused by the write process. Accordingly, if an access collision occurs within the certain cache segment, an exclusive control (that is, cache segment exclusive control) can be carried out by checking the statuses stored in the cache segment management table 225. If an access collision occurs within the cache segment between the I/O process such as the read or write process and a subsequent I/O process, and the cache segment searched and accessed by the subsequent I/O process such as the read or write process from the host unit 1 is already in use, the subsequent I/O waits within the disk control unit 2 until the I/O process that is presently using this cache segment ends. Unlike the conventional method which simply carries out the exclusive control (or management) of the in-use state of the cache memory 23 in units of cache segments, this embodiment carries out the exclusive control (or management) of the in-use state of the cache memory 23 for each access range, so as to enable accesses to be made in parallel unless a contention of the access ranges actually exists.

Figure 6:
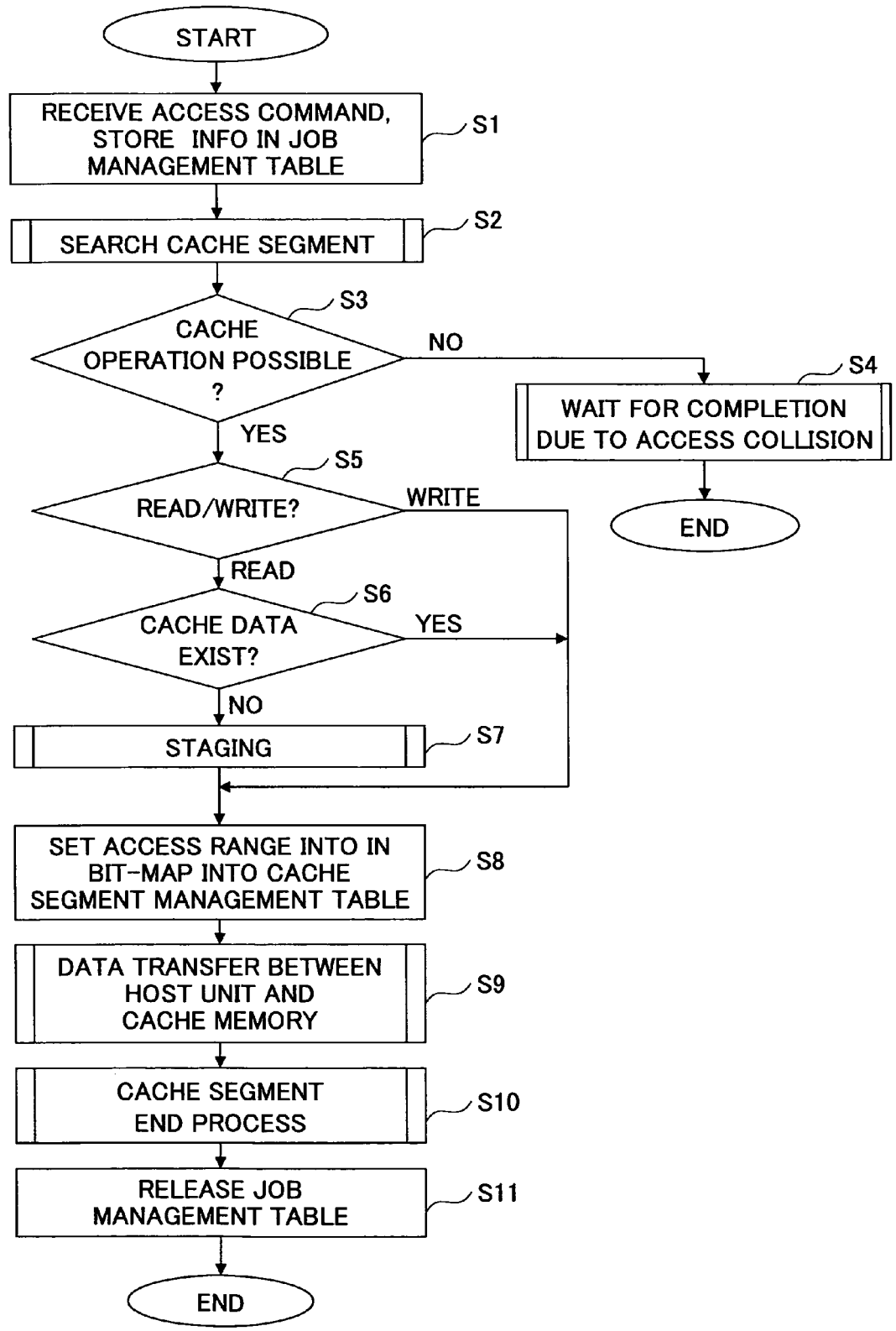
FIG. 6 is a flow chart for explaining a general operation of the embodiment.

FIG. 6 is a flow chart for explaining a general operation of this embodiment. The process shown in FIG. 6 is carried out by the CM 22 shown in FIG. 1. In FIG. 6, a step S1 receives an access command, that is, a read command or a write command, from the host unit 1 via the CA 21, and stores information related to the access command in the job management table 224. A step S2 carries out a cache segment search process to search the cache segment accessed by the access command.

Figure 7:
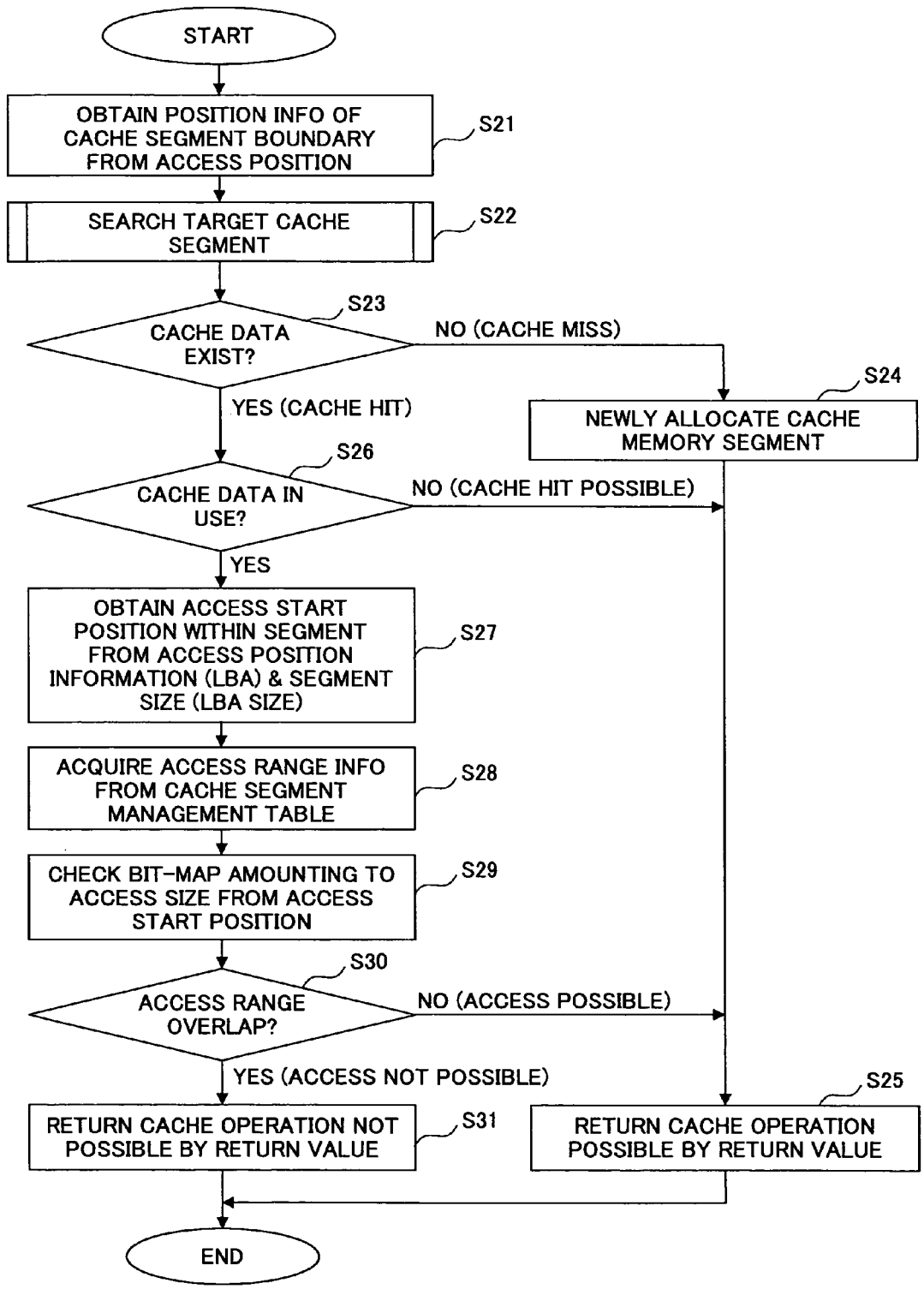
FIG. 7 is a flow chart for explaining a cache segment search process.

FIG. 7 is a flow chart for explaining the cache segment search process that is carried out by the step S2. In FIG. 7, a step S21 obtains position information of a cache segment boundary based on an access position, and a step S22 searches a target cache segment by hashing, for example. Hence, a search is made for the cache segment which holds the data of the accessed range. A step S23 decides whether or not the cache data exists at the access position. If a cache miss occurs and the decision result in the step S23 is NO, a step S24 allocates a new cache segment by a known method. In addition, a step S25 returns to the step S3 shown in FIG. 6 information that indicates that the cache operation is possible with a return value, and the process shown in FIG. 7 ends.

On the other hand, if a cache hit occurs and the decision result in the step S23 is YES, a step S26 decides whether or not the cache data is in use. If the decision result in the step S26 is NO and a cache hit is possible, the process advances to the step S25 described above. If the decision result in the step S26 is YES, a step S27 obtains an access start position within the cache segment, based on the access position information indicated by the LBA and the cache segment size indicated by the access size (LBA size). A step S28 acquires the access range information (bit map) from the cache segment management table 225, and a step S29 checks the bit map corresponding to the access size from the access start position. A step S30 decides whether or not an access range overlap occurs. In other words, if the target cache segment is found, the step S30 checks whether or not the present access range overlaps the access ranged stored in the cache segment management table 225. If the decision result in the step S30 is NO and the access is possible, the process advances to the step S25. On the other hand, if the decision result in the step S30 is YES and the access is not possible, a step S31 returns to the step S3 shown in FIG. 6 information that indicates that the cache operation is not possible with a return value, and the process shown in FIG. 7 ends.

Returning now to the description of FIG. 6, the step S3 decides whether or not the cache operation is possible, based on the result of the cache segment search process carried out in the step S2. If the cache operation is not possible and the decision result in the step S3 is NO, a step S4 judges that an access collision has occurred, and the subsequent access command is queued to wait until the access process that is presently in progress is completed, before the process shown in FIG. 6 ends.

If the decision result in the step S3 is YES, a step S5 decides whether the access command is a read command or a write command. The process advances to a step S6 if the access command is a read command, and the process advances to a step S8 which will be described later if the access command is a write command. The step S6 decides whether or not the cache data exists in the cache memory 23, and the process advances to the step S8 if the decision result in the step S6 is YES. In other words, with respect to the access command from the host unit 1, the access information is first stored in the job management table 224, and then, the search to determine whether or not the data that is the access target exists in the cache memory 23 based on the information stored in the job management table 224. If the decision result in the step S6 is NO, a step S7 carries out a staging process to read the data from one or more disks 31 of the disk unit 3, and the process advances to the step S8.

Figure 8:
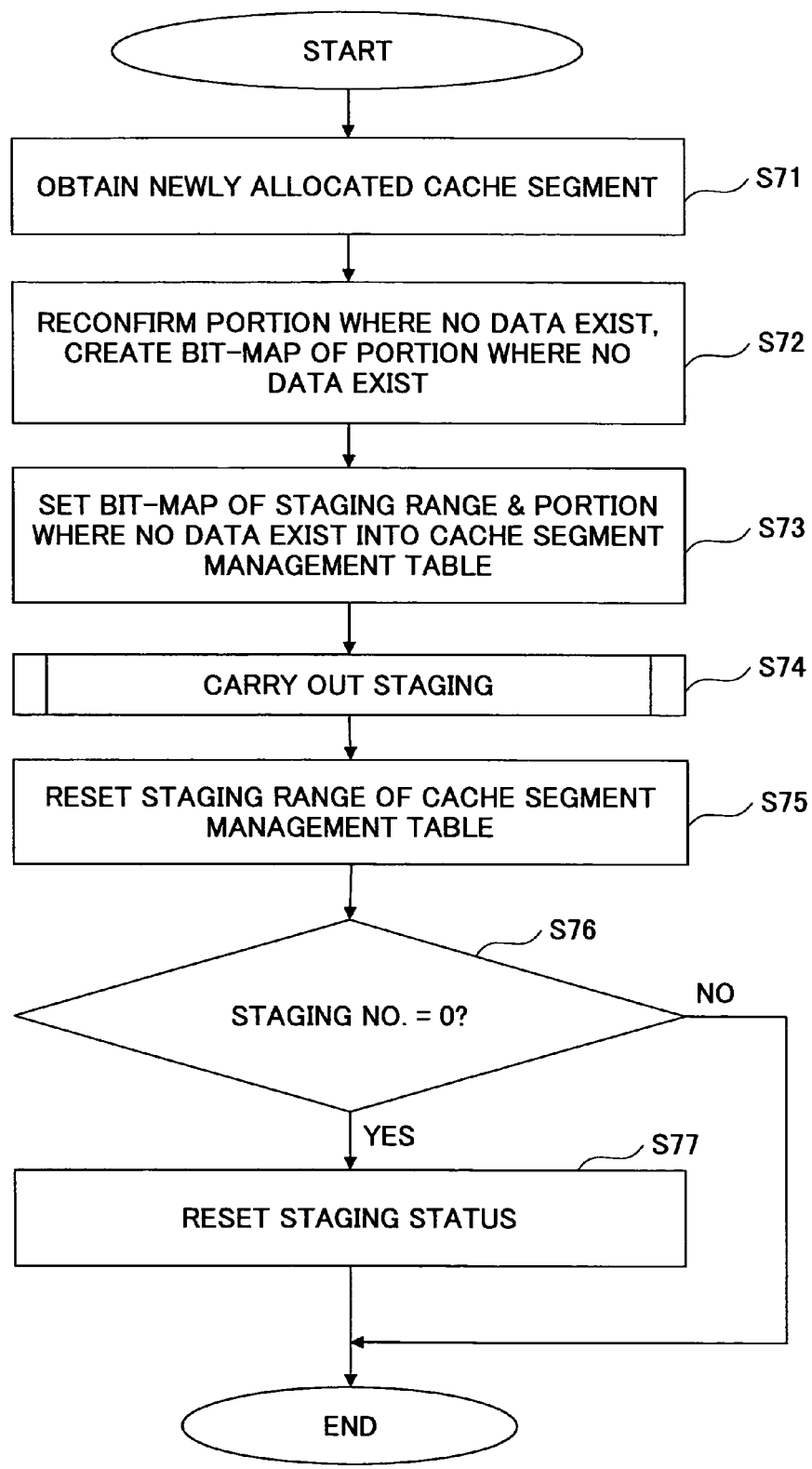
FIG. 8 is a flow chart for explaining a staging process.

FIG. 8 is a flow chart for explaining the staging process carried out by the step S7. In FIG. 8, a step S71 obtains a newly allocated cache segment of the cache memory 23, and a step S72 reconfirms a portion where no data exists and creates a bit map of the portion where no data exists. A step S73 sets the staging range, in the bit map, into the access range information stored in the cache segment management table 225, and also sets the portion where no data exist, in the bit map, into the data existence information stored in the cache segment management table 225. A step S74 carries out a staging process by a known method, and a step S75 resets the access range information, that is, the staging rage, in the cache segment management table 225. A step S76 decides whether or not the staging number has become equal to "0", and the process shown in FIG. 8 ends if the decision result in the step S76 is NO. If the decision result in the step S76 is YES, a step S77 resets the staging status of the cache segment management table 225, and the process shown in FIG. 8 ends.

Returning now to the description of FIG. 6, the step S8 sets the access range information, in the bit map, in the cache segment management table 225, sets the status (or operation flag) corresponding to the executed process (or operation), and adds "1" to the used number (number of times the process is being executed) of the corresponding process (or operation). A step S9 carries out a data transfer between the host unit 1 and the cache memory 23 within the disk control unit 2, and a step S10 carries out an access end process with respect to the cache segment.

Figure 9:
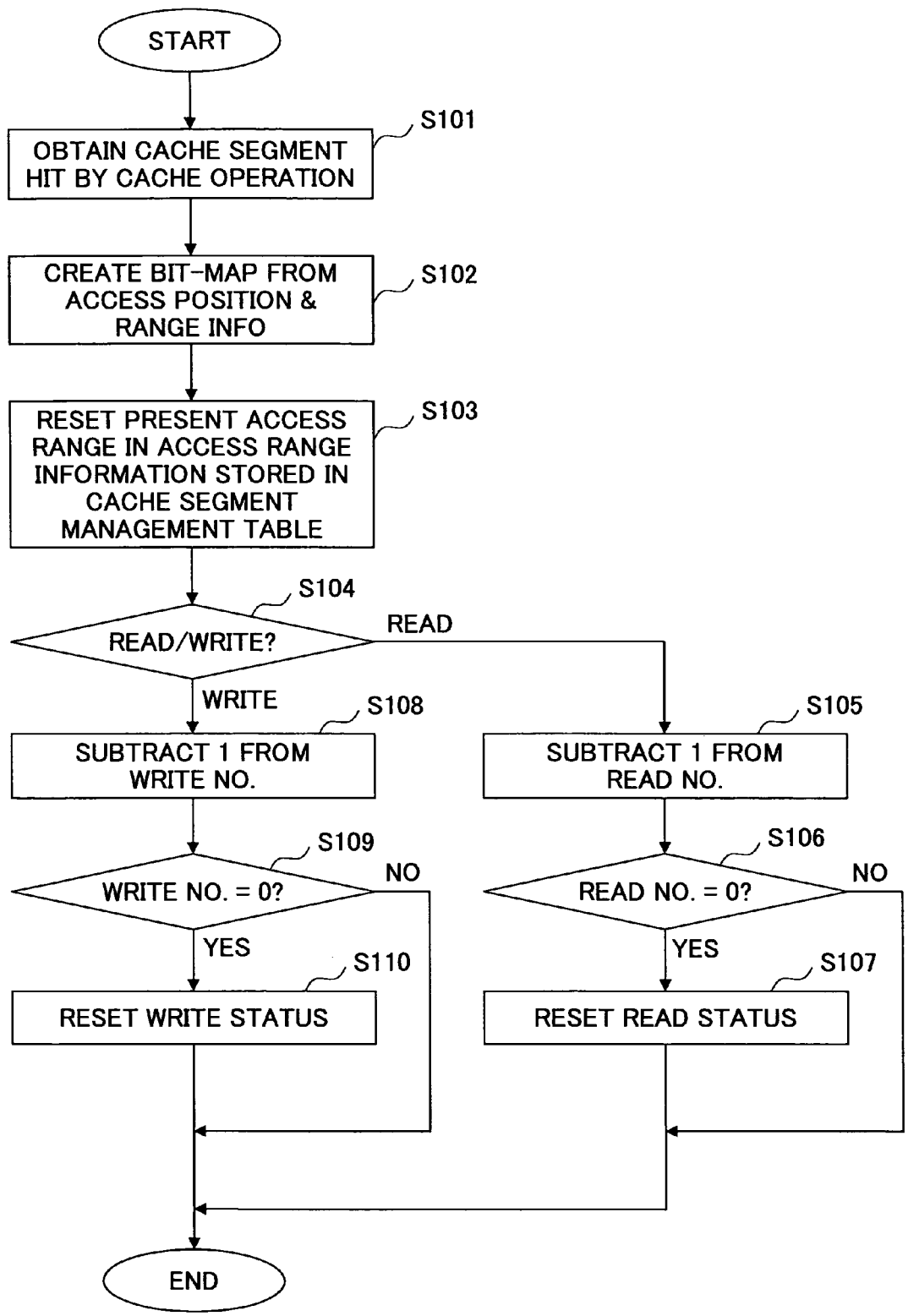
FIG. 9 is a flow chart for explaining an access end process.

FIG. 9 is a flow chart for explaining the access end process carried out by the step S10. In FIG. 9, a step S101 obtains the cache segment that was hit by the cache operation, and a step S102 creates a bit map from the presently accessed position and the access range information. A step S103 resets the present access range in the access range information (bit map) stored in the cache segment management table 225. A step S104 decides whether the present access is a read or a write, and the process advances to a step S105 if the present access is a read, while the process advances to a step S108 if the present access is a write.

The step S105 subtracts "1" from the read number in the cache segment management table 225, and a step S106 decides whether or not the read number has become equal to "0". The process shown in FIG. 9 ends if the decision result in the step S106 is NO. If the decision result in the step S106 is YES, a step S107 resets the read status in the cache segment management table 225, and the process shown in FIG. 9 ends.

The step S108 subtracts "1" from the write number in the cache segment management table 225, and a step S09 decides whether or not the write number has become equal to "0". The process shown in FIG. 9 ends if the decision result in the step S109 is NO. If the decision result in the step S109 is YES, a step S110 resets the write status in the cache segment management table 225, and the process shown in FIG. 9 ends.

Returning now to the description of FIG. 6, a step S11 releases the job management table 224 to an updatable state, and the process shown in FIG. 6 ends.

The access performance can be improved if the write data are gathered to a certain extent and the gathered write data are written to one or more disks 31 within the disk unit 3 by one write-back process. In this embodiment, if the write data to be subjected to the write-back process exists even in the present accessed range of the cache memory 23, the write-back process is carried out even though the collision of the access range occurs. However, during the write access from the host unit 1, the data cannot be guaranteed if the write-back process is carried out to write the data in this access range to one or more disks 31. Hence, the data is not subjected to the write-back process if the write status in the cache segment management table 225 indicates that the write access is in progress.

As described above, the cache segment management table 225 stores the data existence information and the access range information in the form of the bit-map information corresponding to the amount of data that may be stored in one cache segment, and thus, it is possible to know the present access range that is presently being accessed by referring to the cache segment management table 225. For example, in a case where 64 kB of data can be stored in one cache segment, 128-bit (16-byte) bit map information is stored in the cache segment management table 225 by setting 1 bit for 1 LBA (512 bytes). The cache segment management table 225 also stores the status (or operation flag) indicating the process that is using the cache segment, and the used number of each process (or operation), that is, number of times the process is being carried out. Since the cache segment management table 225 manages the contents (status, used number and the like) of the process (or operation) that is carried out within the disk control unit 2 with respect to the access command from the host unit 1, it is possible to appropriately schedule the access commands using the cache segment management table 225.

Moreover, the access information related to the access command from the host unit 1 is managed by the job management table 224 until the access is completed. The access information includes the LBA, the access size, the LUN, the read command or the write command, the cache segment and the access range (start LBA offset and access size).

For this reason, the access to the cache segment used by the access command from the host unit 1 is permitted when there is no access range overlap, even if a contention occurs between the cache segment used by the access command from the host unit 1 and the cache segment used by an access command that is presently being executed.

Figure 10:
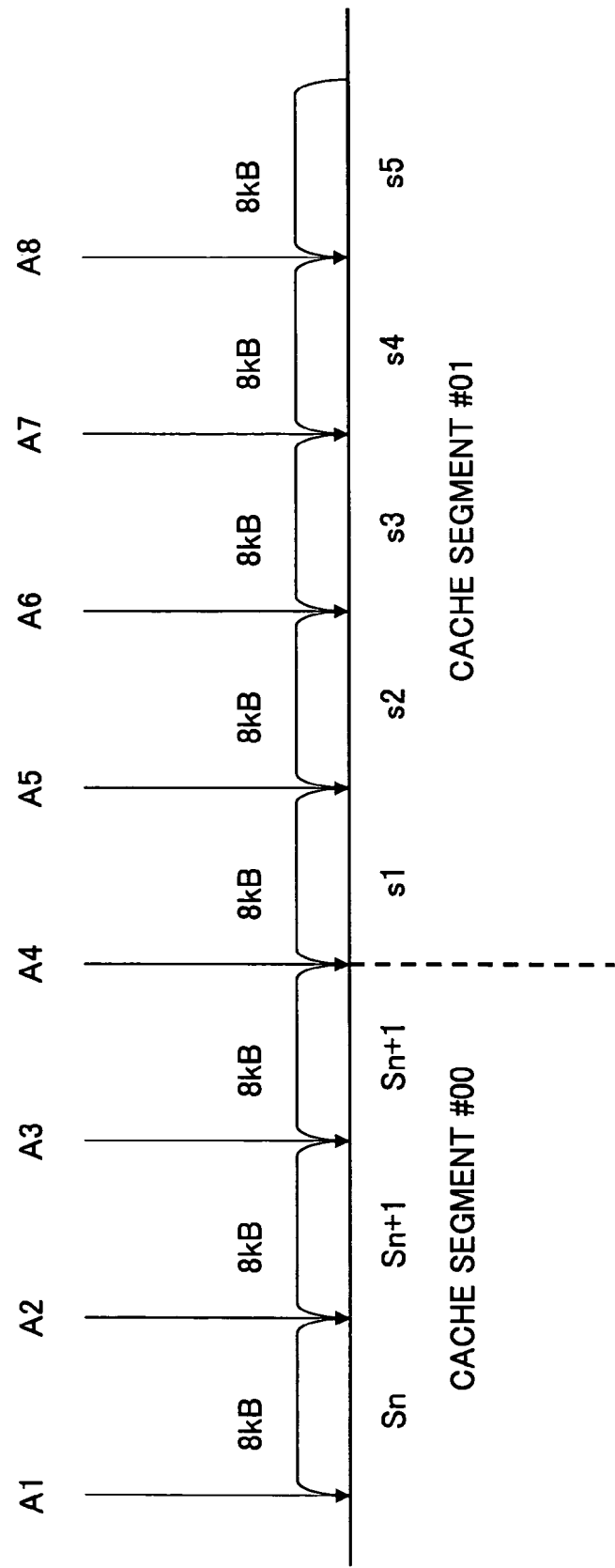
FIG. 10 is a diagram for explaining a sequential access.

FIG. 10 is a diagram for explaining a sequential access. FIG. 10 shows a case where access commands A1 through A8 are sequentially generated from the host unit 1. In the case of such a sequential access, a problem is generated in the access performance when the conventional cache segment exclusive control is carried out.

According to the conventional cache segment exclusive control, the sequential access of the access commands A1 through A8 is processed in the following manner. That is, the access command A1 is processed by allocating thereto a cache segment #00. The exclusive control is carried out by putting the entire cache segment #00, including the access range of 8 kB, in the in-use state. Accordingly, the subsequent access commands A2 and S3 must wait until the processing of the access command A1 ends. Further, the access command A4 is processed by allocating thereto a cache segment #01. The exclusive control is carried out by putting the entire cache segment #01, including the access range of 8 kB, in the in-use state. Hence, the subsequent access commands A5 through A8 must wait until the processing of the access command A4 ends.

Therefore, when the conventional cache segment exclusive control is carried out for the sequential access, the order in which the access commands A1 through A8 are processed cannot always be maintained to the original order of the sequential access.

On the other hand, according to the embodiment described heretofore, the access commands A1 through A8 are processed in the following manner, as shown in FIG. 10. That is, the access command A1 is processed by allocating thereto a range sn of a cache segment #00. The cache segment exclusive control is carried out with respect to the cache segment #00 to put only the access range sn of 8 kB to the in-use state. Hence, the subsequent access commands A2 and A3 do not have to wait until the processing of the access command A1 and ends, and the access commands A2 and A3 can be processed by allocating thereto access ranges sn+1 and sn+2 of the cache segment #00, which do not overlap the access range sn. Further, the access command A4 is processed by allocating thereto an access range s1 of a cache segment "01. The cache segment exclusive control is carried out with respect to the cache segment #01 to put only the access range s1 of 8 kB to the in-use state. Hence, the subsequent access commands A5 through A8 do not have to wait until the processing of the access command A4 and ends, and the access commands A5 through A8 can be processed by allocating thereto access ranges s2 through s5 of the cache segment #01, which do not overlap the access range s1.

Therefore, when the cache segment exclusive control of this embodiment is applied to the sequential access, the processing of the access commands A1 through A8 does not need to wait, and the order in which the access commands A1 through A8 are processed can be maintained to the original correct order of the sequential access.

In the embodiment described above, the access range is managed in the form of the bit-map information, but the access range can of course be managed in a form other than the bit-map information. Information other than the bit-map information, which enables identification of the access range, can be used to similarly manage the access range.

The job management information may be stored in a form other than the job management table 224. Similarly, the cache segment management information may be stored in a form other than the cache segment management table 225.

The application of the present invention is not limited to the magnetic disk unit, and the present invention is similarly applicable to other disk units such as optical disk units and magneto-optic disk units. Moreover, the present invention may be applied to any storage unit which requires a cache function and uses one or more recording media other than disks.

Further, the present invention is not limited to these embodiments, but various variations and modifications may be made without departing from the scope of the present invention.

What is claimed is:

1. An access control method for a cache memory that is segmented into cache segments, comprising:
  receiving an access command; and
  determining whether an access range overlap has occurred between a cache segment accessed by the access command and an arbitrary cache segment that is already being accessed, based on cache segment management information including access range information that simultaneously indicates an access range that is already being accessed by accesses with respect to the arbitrary cache segment; and
  permitting access to the cache segment accessed by the access command if no access range overlap has occurred, even when a contention exists between the cache segment and the arbitrary cache segment that is already being accessed.

2. The access control method as claimed in claim 1, further comprising:
  storing the cache segment management information including a status of each process that uses the cache segment and an in-use state of the cache segment by each process.

3. The access control method as claimed in claim 2, wherein the cache segment management information includes, in addition to the access range information, the status and the in-use state, an address indicating a location of data and data existence information indicating an existence of data.

4. The access control method as claimed in claim 3, wherein said storing stores the data existence information and/or the access range information in a form of bit-map information.

5. The access control method as claimed in claim 2, further comprising:
  updating a status corresponding to an executed process and an in-use state corresponding to the executed process.

6. The access control method as claimed in claim 1, wherein said storing stores the cache segment management information in a form of a cache segment management table.

7. The access control method as claimed in claim 1, further comprising:
  searching, based on access information stored in a job management table, to determine whether or not data that is a target of the access exists in the cache memory; and
  reading the data that is the target of the access from a storage unit by carrying out a staging process if the data does not exist in the cache memory.

8. The access control method as claimed in claim 1, further comprising:
  resetting the cache segment management information when the access of the access command ends.

9. A disk control unit for controlling an input to and an output from one or a plurality of disks, comprising:
  a cache memory that is segmented into cache segments; and
  a control unit configured to determine whether an access range overlap has occurred between a cache segment accessed by an access command and an arbitrary cache segment that is already being accessed, based on cache segment management information including access range information that simultaneously indicates an access range that is already being accessed by accesses with respect to the arbitrary cache segment, and to permit access to the cache segment accessed by the access command if no access range overlap has occurred, even when a contention exists between the cache segment and the arbitrary cache segment that is already being accessed, wherein:
    said cache controller stores the cache segment management information in a form of a cache segment management table, and
    said control unit resets the cache segment management information when the access of the access command ends.

10. The disk control unit as claimed in claim 9, wherein said control unit comprises a cache controller configured to store the cache segment management information including a status of each process that uses the cache segment and an in-use state of the cache segment by each process.

11. The disk control unit as claimed in claim 10, wherein the cache segment management information includes, in addition to the access range information, the status and the in-use state, an address indicating a location of data and data existence information indicating existence of data.

12. The disk control unit as claimed in claim 11, wherein said cache controller stores the data existence information and/or the access range information in a form of bit-map information.

13. The disk control unit as claimed in claim 10, wherein said control unit updates a status corresponding to an executed process and an in-use state corresponding to the executed process.

14. The disk control unit as claimed in claim 9, wherein said cache controller stores the cache segment management information in a form of a cache segment management table.

15. The disk control unit as claimed in claim 9, wherein said control unit comprises:
an input or output controller configured to search, based on access information stored in a job management table thereof, and determine whether or not data that is a target of the access exist in the cache memory; and
a disk controller configured to read the data that is the target of the access from the one or plurality of disks by carrying out a staging process if the data do not exist in the cache memory.

16. The disk control unit as claimed in claim 9, wherein said control unit resets the cache segment management information when the access of the access command ends.

17. A storage apparatus, comprising:
a storage unit having a plurality of recording media; and
a medium control unit, configured to control input to and output from the recording media, comprising:
a cache memory that is segmented into cache segments; and
a control unit configured to determine whether an access range overlap has occurred between a cache segment accessed by an access command and an arbitrary cache segment that is already being accessed, based on cache segment management information including access range information that simultaneously indicates an access range that is already being accessed by accesses with respect to the arbitrary cache segment, and to permit access to the cache segment accessed by the access command if no access range overlap has occurred, even when a contention exists between the cache segment and the arbitrary cache segment that is already being accessed.

18. The storage apparatus as claimed in claim 17, wherein the control unit of the medium control unit comprises a cache controller configured to store the cache segment management information including a status of each process that uses the cache segment and an in-use state of the cache segment by each process.

19. The storage apparatus as claimed in claim 18, wherein the cache segment management information includes, in addition to the access range information, the status and the in-use state, an address indicating a location of data and data existence information indicating existence of data.

20. The storage apparatus as claimed in claim 19, wherein said cache controller stores the data existence information and/or the access range information in a form of bit-map information.

21. The storage apparatus as claimed in claim 18, wherein the control unit of the medium control unit updates a status corresponding to an executed process and an in-use state corresponding to the executed process.

22. The storage apparatus as claimed in claim 17, wherein said cache controller stores the cache segment management information in a form of a cache segment management table.

23. The storage apparatus as claimed in claim 17, wherein the control unit of the medium control unit comprises:
an input or output controller configured to search, based on access information stored in a job management table thereof, and determine whether or not data that is a target of the access exists in the cache memory; and
a medium controller configured to read the data that is the target of the access from one or more recording media by carrying out a staging process if the data does not exist in the cache memory.

24. The storage apparatus as claimed in claim 17, wherein the control unit of the medium control unit resets the cache segment management information when the access of the access command ends.

* * * * *